United States Patent [19]
Mead

[11] 3,799,998
[45] Mar. 26, 1974

[54] MANUFACTURE OF HALOGENATED HYDROCARBONS
[75] Inventor: David Geoffrey Mead, Widnes, England
[73] Assignee: Imperial Chemical Industries Limited, London, England
[22] Filed: July 31, 1969
[21] Appl. No.: 855,444

Related U.S. Application Data
[62] Division of Ser. No. 518,015, Jan. 3, 1966, Pat. No. 3,480,682.

[52] U.S. Cl....... 260/654 A, 260/656 R, 260/659 A
[51] Int. Cl............................................. C07c 21/02
[58] Field of Search......... 260/656 R, 654 A, 659 A

[56] References Cited
UNITED STATES PATENTS
| | | | |
|---|---|---|---|
| 3,504,043 | 3/1970 | Kominami et al............... | 260/656 R |
| 3,267,161 | 8/1966 | Ukaji et al..................... | 260/656 R |
| 2,327,174 | 8/1943 | Cass.............................. | 260/654 A |

FOREIGN PATENTS OR APPLICATIONS
| | | | |
|---|---|---|---|
| 968,933 | 9/1964 | Great Britain.................. | 260/659 A |
| 971,996 | 10/1964 | Great Britain.................. | 260/659 A |

*Primary Examiner*—Leon Zitver
*Assistant Examiner*—Joseph A. Bosko
*Attorney, Agent, or Firm*—Cushman, Darby & Cushman

[57] ABSTRACT

Method of producing monohalogenated olefins by oxyhalogenating an olefin at a temperature between 250° and 550° C in the presence of a supported catalyst containing platinum or rhodium and a compound of copper and a rare earth metal. The catalyst may also contain a compound of an alkali-metal or an alkaline earth metal. The catalyst support is titania, zirconia or alumina having a specific surface area between about 0.5 to 50m$^2$ per gram.

16 Claims, No Drawings

MANUFACTURE OF HALOGENATED HYDROCARBONS

This is a division of application Ser. No. 518,015, filed Jan. 3, 1966, now U.S. Pat. No. 3,480,682.

The invention relates to the manufacture of monohalogenated olefinic compounds.

In our British Patent Specification 968,933 a process is described for the manufacture of halogonated hydrocarbons, for example, vinyl chloride, which comprises contacting a gaseous mixture comprising an olefine, a hydrogen halide and oxygen with a supported catalyst at elevated temperature, the catalyst comprising a compound of a metal of the platinum group, that is, a compound of one of the metals, platinum, palladium, rhodium, ruthenium, osmium and iridium. It is also stated that it is desirable to incorporate in the catalyst a compound of a metal of variable valency such as copper chloride. Again in the specification of our copending British Application 22322/63 it is stated that the activity of such a catalyst may be increased by incorporating therewith a compound of a rare earth metal.

Such processes make a significant contribution to the art such as for example in the single stage conversion of ethylene to vinyl chloride in that in the reaction product there is found a reasonably high proportion of vinyl chloride with respect to 1:2-dichloroethane. However in such processes, if it is attempted to increase the conversion of ethylene to vinyl chloride there is a sharp increase in the amount of burning of organic compounds to carbon oxides.

We have now found in the manufacture of monohalogenated olefines that high yields of said compounds coupled with high ratios of monohalogenated olefines to other halohydrocarbons while avoiding excessive burning of the organic compounds to carbon oxides may be obtained by bringing into reaction an olefine with hydrogen halide and a source of molecular oxygen at elevated temperature in the presence of a catalyst comprising platinum or rhodium or a compound thereof carried on a specific type of support.

According to the present invention, therefore, we provide a process for the manufacture of monohalogenated olefines which comprises bringing into reaction an olefine with hydrogen halide and a source of molecular oxygen at elevated temperature in the presence of a catalyst comprising platinum or rhodium or a compound thereof carried on a low surface area titania, zirconia or alumina support.

It is preferred to incorporate in the (platinum or rhodium) catalyst another compound of a metal of variable valency. It is particularly preferred to incorporate in the catalyst compounds of rare earth metals, suitably those consisting entirely of or containing a significant amount of a compound of cerium. A compound of copper or iron may be incorporated in the catalyst instead of the compound of a rare earth metal although the copper and iron compounds do tend to volatilise at high temperatures. Some of the advantages of the particularly preferred catalyst may be obtained however by incorporating in the copper or iron containing catalyst a compound of a rare earth metal, for example those metals of atomic numbers 57 to 71. Other compounds of metals of variable valency such as uranium, lead, titanium and zirconium may be incorporated in the catalysts of the invention if desired. Alkali metal compounds or alkaline earth metal compounds may also be incorporated in the catalyst. For example up to 2 percent by weight of such compounds (expressed as metal) may be incorporated in the support. The compounds of the metals incorporated in the catalysts are suitably, but not necessarily, the halides corresponding to the halogen of the halogenated compound produced. The composition of the components of the catalyst may vary during the reaction. Thus when the halogenating agent is hydrogen chloride the components of the catalyst may exist as chlorides, mixtures of chlorides and/or the metals, or as oxides.

The presence of platinum or rhodium as components of the catalyst is essential in the process of the invention. They have a pronounced directive effect in that a substitutive halogenation of the olefine occurs to give a monohalogenated olefine rather than an additive halogenation of the olefine to give a saturated halogenated hydrocarbon. Of the compounds of platinum and rhodium, compounds of rhodium are preferred. One particularly useful catalyst comprises compounds of rhodium and cerium.

Suitable proportions by weight of platinum or rhodium to the support are in the range 0.01 to 2 percent, preferably 0.02 to 1 percent. Suitable proportions of the compounds of rare earth metals and/or compounds of said other metals of variable valency expressed as the metal are in the range 0.5 to 15 percent by weight of the support.

Suitably the surface area of the support is 0.5 to 50 $m^2$/gram and is preferably less than 30 $m^2$/gram. Supports of large surface area, for example, an activated alumina known under the Registered Trade Mark 'Actal' A of surface area 200 $m^2$/gram give useful results but not the improved results of the present invention. Low surface area alumina supports may be obtained by heating activated aluminas at elevated temperature, for example, by heating aluminas at 800°C. to 1,400°C. for several hours. Low surface area titania supports may be obtained by heating titania at elevated temperature, for example, at 600°C. to 1100°C., suitably 800°C. to 1,000°C. Low surface area zirconia supports may be obtained by heating zirconia at 700°C. to 1,200°C. These low surface area supports may be obtained by heating the corresponding supports of large surface area in air, in the presence of an inert gas such as nitrogen or in the presence of steam. Generally the higher the temperature employed to calcine the support the lower is the surface area of the heat-treated support.

The supported catalysts may be employed in fixed, moving burden, or fluidised beds. More particularly in fixed beds the supported catalyst may be mixed with further quantities of the same support or with a diluent such as pumice, quartz or silicon carbide which assist in controlling the heat of the reaction. In a fixed bed system a graded bed could be used, that is, one wherein the ratio of support or diluent particles to supported catalyst is greatest at the inlet end of the bed and is diminished from the inlet end to the outlet end of the bed.

Olefine reactants which can be employed include, for example, ethylene, propylene, straight and branched-chain olefines containing four or more carbon atoms, cyclic olefines such as cyclohexene and olefines containing aryl groups such as styrene.

Reaction temperatures in the range 250°C. to 550°C. are generally employed although the particular temperature employed depends on the particular olefine reactant. For example in the manufacture of vinyl chloride from ethylene temperatures in the range 300°C. to 550°C. preferably 300°C. to 500°C. are employed. The process may be carried out at atmospheric or superatmospheric pressure.

A suitable source of molecular oxygen is air or oxygen itself. The concentration of oxygen in the total feed gas is capable of considerable variation and is dependent on various features such as the particular catalyst employed, the proportion of diluent to the supported catalyst, the particular olefine reactant, the reaction temperature and the type of bed. The concentrations of oxygen to the total feed gases of up to 10 percent by volume or considerably higher proportions, for example, up to 15 percent by volume may be employed. The process may be carried out in the presence of a gaseous diluent which is at least one of the following: nitrogen (in excess of that derived from air), carbon oxides, steam, excess olefine, and excess hydrogen halide. Preferably a molar excess of ethylene with respect to oxygen is employed. Unreacted ethylene and hydrogen halide and any unreacted oxygen can be recycled. Also carbon monoxide and carbon dioxide can be recycled, the carbon monoxide being partially converted to carbon dioxide in the reaction zone.

The reaction product contains the desired monohalogenated olefin in admixture with minor amounts of other halohydrocarbons, carbon oxides, water vapour, and may contain residual nitrogen, unreacted olefine, and unreacted hydrogen halide. The monohalogenated olefine can be isolated from the mixture by conventional procedures. Thus in the case of manufacture of vinyl chloride, the reactor exit gas may be chilled to condense out the water and then scrubbed with an appropriate solvent (conveniently ethylene dichloride) to separate the halohydrocarbons from the inorganic constituents and unreacted ethylene. The ethylene dichloride solution is then fractionated to recover the vinyl chloride. The ethylene dichloride may be recycled and used again for scrubbing further quantities of reactor exit gas.

The following Examples illustrate but do not limit the invention.

EXAMPLE 1

The support for the catalyst was alumina in the form of cylindrical pellets having a diameter and length of 0.32 cm and of specific surface area 22 m²/gram. The alumina had been calcined at 1,000°C. for 4 hours. 15 ml of the pellets were impregnated with 6.3 ml of an aqueous solution containing 2.1 gram $CuCl_2 \cdot 2H_2O$ and 1.2 gram $CeCl_2 \cdot 3H_2O$. The pellets were then dried for 4 hours at 110°C. They were then reimpregnated with 6.3 ml of a solution containing ammonium chlororhodite dissolved in hydrochloric acid (containing a total of 0.039 gram Rh) and the pellets were dried as before. The supported catalyst contained 5 percent by weight Cu, 3 percent by weight Ce and 0.25 percent by weight Rh.

The procedure then was to dilute 10 ml of the supported catalyst with 30 ml of pumice (specific surface area 0.15 m²/gram; particle size 10–18 mesh). The mixture was placed in a heat-resistant glass tube of 1.9 cm internal diameter. The furnace temperature was 400°C. and a gas mixture containing 29% v/v HCl, 6.3% v/v $O_2$, 14.2% v/v $C_2H_4$ and 50.5% v/v nitrogen was passed over the heated catalyst. The total feed rate amounted to 30 litres/hour (measured at 20°C.). When static conditions had been established the exit gas stream was analysed and found to contain

| COMPOUND | % v/v |
|---|---|
| $CH_2=CHCl$ | 5.9 |
| $C_2H_4Cl$ | 0.1 |
| c and t CHCl=CHCl | 0.4 |
| $CH_2Cl \cdot CH_2Cl$ | 0.7 |
| CO | 0.3 |
| $CO_2$ | 1.3 |
| $H_2O$ | 9.0 |
| HCl | 22.2 |
| $O_2$ | 0.6 |
| $C_2H_4$ | 7.0 |
| $N_2$ | 52.5 |

EXAMPLE 2

An alumina-supported catalyst was prepared in a similar manner to that of Example 1 except that it did not contain copper. The supported catalyst contained 5 percent by weight Ce and 0.1 percent by weight Rh.

The procedure of Example 1 was repeated except that the furnace temperature was 425°C. When static conditions had been established the exit gas stream was analysed and found to contain

| COMPOUND | % v/v |
|---|---|
| $CH_2=CHCl$ | 5.7 |
| c and t CHCl=CHCl | 0.2 |
| $CH_2Cl \cdot CH_2Cl$ | 0.1 |
| CO | 1.1 |
| $CO_2$ | 1.1 |
| $H_2O$ | 8.3 |
| HCl | 23.6 |
| $O_2$ | 0.7 |
| $C_2H_4$ | 7.5 |
| $N_2$ | 51.7 |

EXAMPLE 3

The support in this Example was titania of pellet size as described in Example 1 and of specific surface area 10 m²/gram. The titania had been calcined at 850°C. for 4 hours. The supported catalyst was prepared in a similar manner to that of Example 2 but contained iron instead of cerium. The supported catalyst contained 2 percent by weight Fe and 0.05 percent by weight Rh.

The procedure of Example 1 was repeated except that the furnace temperature was 450°C. When static conditions had been established the exit gas stream was analysed and found to contain

| COMPOUND | % v/v |
|---|---|
| $CH_2=CHCl$ | 6.2 |
| c and t CHCl=CHCl | 0.4 |
| $CH_2Cl \cdot CH_2Cl$ | 0.6 |
| CO | 0.5 |
| $CO_2$ | 1.5 |
| $H_2O$ | 9.6 |
| HCl | 22.1 |
| $O_2$ | 0.0 |
| $C_2H_4$ | 6.6 |
| $N_2$ | 52.5 |

EXAMPLE 4

A titania-supported catalyst was prepared as in Example 3 except that the titania had been calcined at 700°C. for 4 hours and had a specific surface area of 24 m²/gram. The supported catalyst contained 5 percent by weight Ce and 0.1 percent by weight Rh.

The procedure of Example 3 was repeated. When static conditions had been established the exit gas stream was analysed and found to contain

| COMPOUND | % v/v |
| --- | --- |
| $CH_2=CHCl$ | 6.7 |
| $C_2H_2Cl$ | 0.1 |
| c and t $CHCl=CHCl$ | 0.6 |
| $CH_2Cl \cdot CH_2Cl$ | 0.2 |
| CO | 0.6 |
| $CO_2$ | 1.6 |
| $H_2O$ | 10.0 |
| HCl | 21.8 |
| $O_2$ | 0.0 |
| $C_2H_4$ | 6.2 |
| $N_2$ | 52.2 |

COMPARISON

By way of comparison Example 4 was repeated at 400°C. but this time with a titania support of high surface area, viz. 70 m²/gram.

After several hours on flow the exit gas stream was analysed and found to contain

| COMPOUND | % v/v |
| --- | --- |
| $CH_2=CHCl$ | 2.4 |
| CO | 1.9 |
| $CO_2$ | 1.9 |
| $H_2O$ | 6.2 |
| HCl | 26.7 |
| $O_2$ | 0.3 |
| $C_2H_4$ | 9.9 |
| $N_2$ | 50.7 |

It will be noted that the concentration of vinyl chloride in the exit gas stream was very much lower and the burning was very much higher than in Example 4.

EXAMPLE 5

A titania-supported catalyst was prepared as in Example 3 but contained 5 percent by weight Cu, 3 percent by weight Ce and 0.25% Rh. The run was carried out using the procedure of Example 3 except that the furnace temperature was 478°C. When static conditions had been established the exit gas stream was analysed and found to contain

| COMPOUND | % v/v |
| --- | --- |
| $CH_2=CHCl$ | 5.1 |
| $C_2H_2Cl$ | 0.1 |
| c and t $CHCl=CHCl$ | 1.2 |
| $CH_2Cl \cdot CH_2Cl$ | 0.9 |
| CO | 0.4 |
| $CO_2$ | 1.2 |
| $H_2O$ | 10.0 |
| HCl | 21.1 |
| $O_2$ | 0.2 |
| $C_2H_4$ | 6.8 |
| $N_2$ | 53.0 |

EXAMPLE 6

The support in this Example was microspheroidal titania of average particle size 50μ and of specific surface area 6.7 m²/gram. The titania had been calcined at 825°C. for 2 hours. The titania support was impregnated with cerium chloride and ammonium chlororhodite and dried. The supported catalyst contained 5% w/w Ce and 0.1% w/w Rh.

The reactor comprised a vertical, heat-resistant glass tube of 2.5 cm internal diameter. It was equipped with a 0.63 cm diameter, central thermocouple pocket and a sintered glass disc at the bottom of the tube to support the catalyst. The volume of the catalyst was 75 ml. A gas mixture containing 30% v/v HCl, 5.4% v/v $O_2$, 12.9% v/v $C_2H_4$ and 51.7% v/v $N_2$ was fed at a gas rate of 12.5 l/hr. (measured at 20°C.) upwardly through the reactor and maintained the catalyst in the fluidised state. The temperature of the bed (2.5 cm above the glass disc) was 360°C.

After 24 hours on flow the exit gas stream was analysed and found to contain

| COMPOUND | % v/v |
| --- | --- |
| $CH_2=CHCl$ | 5.1 |
| c and t $CHCl=CHCl$ | 0.1 |
| $CH_2Cl \cdot CH_2Cl$ | 0.1 |
| CO | 0.1 |
| $CO_2$ | 0.9 |
| $H_2O$ | 6.3 |
| HCl | 25.4 |
| $O_2$ | 1.5 |
| $C_2H_4$ | 7.5 |
| $N_2$ | 53.0 |

EXAMPLE 7

The support was titania of pellet size as described in Example 1 and of specific surface area 5 m²/gram. The titania had been calcined at 900°C. for 4 hours. The titania-supported catalyst was prepared in a similar manner to that of Example 3 but contained 5% w/w Ce and 0.1% w/w Rh.

The procedure of Example 1 was repeated except that hydrogen bromide was employed as the hydrogen halide and that the furnace temperature was 450°C.

After several hours on flow the exit gas stream was analysed and found to contain

| COMPOUND | % v/v |
| --- | --- |
| $CH_2CHBr$ | 7.0 |
| $CH_2Br \cdot CH_2Br$ | 0.4 |
| CO | 0.6 |
| $CO_2$ | 1.1 |
| $H_2O$ | 9.1 |
| HBr | 22.4 |
| $O_2$ | 0.6 |
| $C_2H_4$ | 6.3 |
| $N_2$ | 52.5 |

EXAMPLE 8

The support was the low surface area alumina described in Example 1 but which was impregnated and dried to contain 5 percent by weight cerium and 0.1 percent by weight platinum.

The procedure of Example 1 was repeated except that the furnace temperature was 425°C. After several hours on flow the exit gas stream was analysed and found to contain

| COMPOUND | % v/v |
| --- | --- |
| $CH_2=CHCl$ | 2.9 |

| -Continued | |
|---|---|
| c and t CHCl=CHCl | 0.3 |
| CH₂Cl·CH₂Cl | 0.7 |
| CO | 0.6 |
| CO₂ | 0.5 |
| H₂O | 5.2 |
| HCl | 24.8 |
| O₂ | 3.1 |
| C₂H₄ | 10.1 |
| N₂ | 51.8 |

EXAMPLE 9

The support was zirconia of pellet size as described in Example 1. The zirconia was calcined at 900°C. for 4 hours and had a specific surface area of 12.8 m²/gram. The support was impregnated and dried and contained 5 percent by weight cerium and 0.1 percent by weight rhodium.

The procedure of Example 1 was repeated except that the furnace temperature was 425°C. and the composition of the feed gas was 29% v/v HCl, 5.7% v/v O₂, 13.3% v/v C₂H₄ and 52.0% v/v N₂.

After 4 days on flow the exit gas stream was analysed and found to contain

| COMPOUND | % v/v |
|---|---|
| CH₂=CHCl | 5.5 |
| c and t CHCl=CHCl | 0.4 |
| CH₂Cl·CH₂Cl | 0.1 |
| CO | 0.8 |
| CO₂ | 1.2 |
| H₂O | 8.4 |
| HCl | 23.3 |
| O₂ | 0.1 |
| C₂H₄ | 6.8 |
| N₂ | 53.4 |

EXAMPLE 10

A titania-supported catalyst was prepared as in Example 4 except that the supported catalyst contained 5 percent by weight Ce, 0.1 percent by weight Rh and 1 percent by weight K.

The procedure of Example 1 was repeated except that the composition of the feed gas was 29% v/v HCl, 6.0% v/v O₂, 12.9% v/v C₂H₄ and 52.1% v/v N₂.

After 7 days on flow the exit gas stream was analysed and found to contain

| COMPOUND | % v/v |
|---|---|
| CH₂=CHCl | 4.8 |
| c and t CHCl=CHCl | 0.6 |
| CH₂Cl·CH₂Cl | 0.6 |
| CO | 0.3 |
| CO₂ | 0.6 |
| H₂O | 7.4 |
| HCl | 23.0 |
| O₂ | 1.7 |
| C₂H₄ | 7.0 |
| N₂ | 54.0 |

EXAMPLE 11

The support was titania of pellet size as described in Example 1 and was of specific surface area of approximately 70 m²/gram. The support was impregnated and dried and contained 5% w/w cerium and 0.1% w/w rhodium. After impregnation the titanium support was calcined at 800°C. for 4 hours and had then a specific surface area of 10.8 m²/gram.

The procedure of Example 1 was repeated except that the furnace temperature was 425°C.

After 8 days on flow the exit gas stream was analysed and found to contain

| COMPOUND | % v/v |
|---|---|
| CH₂=CHCl | 5.4 |
| c and t CHCl=CHCl | 0.6 |
| CH₂Cl·CH₂Cl | 0.4 |
| CO | 0.5 |
| CO₂ | 1.7 |
| H₂O | 9.0 |
| HCl | 22.8 |
| O₂ | 0.1 |
| C₂H₄ | 7.3 |
| N₂ | 52.2 |

EXAMPLE 12

The support was titania as described in Example 4. The titania was impregnated and dried and contained 0.1 percent by weight rhodium and 5 percent by weight lead.

The procedure of Example 1 was repeated except that the furnace temperature was 450°C.

After a few hours the exit gas stream was analysed and found to contain

| COMPOUND | % v/v |
|---|---|
| CH₂=CHCl | 5.7 |
| c and t CHCl=CHCl | 0.2 |
| CH₂Cl·CH₂Cl | 0.3 |
| CO | 0.9 |
| CO₂ | 1.0 |
| H₂O | 8.3 |
| HCl | 23.2 |
| O₂ | 0.9 |
| C₂H₄ | 7.5 |
| N₂ | 52.0 |

EXAMPLE 13

An alumina-supported catalyst was prepared as in Example 1 except that the support was impregnated and dried to contain 5% w/w Ce, 0.1% w/w Rh, and 1% w/w Ti.

The procedure of Example 1 was repeated except that the feed gas mixture contained 29% v/v HCl, 6.7% v/v O₂, 12.6% v/v C₂H₄ and 51.7% v/v N₂ and that the furnace temperature was 451°C.

After several days on flow the exit gas stream was analysed and found to contain

| COMPOUND | % v/v |
|---|---|
| CH₂=CHCl | 6.0 |
| c and t CHCl=CHCl | 0.6 |
| CH₂Cl·CH₂Cl | 0.3 |
| CO | 0.3 |
| C₂O | 1.4 |
| H₂O | 9.1 |
| HCl | 22.5 |
| O₂ | 0.9 |
| C₂H₄ | 5.4 |
| N₂ | 53.5 |

EXAMPLE 14

The support was titania of pellet size as described in Example 1. The titania had been calcined at 950°C. for 4 hours and was of specific surface area 3 m²/gram. The support was impregnated and dried to contain 0.1% w/w Rh and 5% w/w Ce.

The procedure of Example 1 was repeated except that the gas mixture contained 29% v/v HCl, 6.6% v/v $O_2$, 14.2% v/v $C_2H_4$ and 50.2% v/v $H_2$ and that the furnace temperature was 416°C.

After 6 hours on flow the exit gas stream was analysed and found to contain

| COMPOUND | % v/v |
|---|---|
| $CH_2=CHCl$ | 7.5 |
| c and t $CHCl=CHCl$ | 0.6 |
| $CH_2Cl\cdot CH_2Cl$ | 0.4 |
| CO | 0.3 |
| $CO_2$ | 0.8 |
| $H_2O$ | 10.3 |
| HCl | 20.8 |
| $O_2$ | 0.8 |
| $C_2H_4$ | 5.8 |
| $N_2$ | 52.7 |

EXAMPLE 15

The supported catalyst in this Example was that described in Example 6. It had been used in the present catalysed reaction of ethylene, oxygen and hydrogen chloride to give vinyl chloride under a variety of reaction conditions such as different temperature conditions and different feed gas compositions over a continuous period of 2 months.

The procedure of Example 6 was repeated utilising this supported catalyst in a fluidised bed technique except that the gas mixture contained 34% v/v HCl, 11.0% v/v $O_2$, 13.8% v/v $C_2H_4$ and 41.2% v/v $N_2$.

After several hours on flow the exit gas stream was analysed and found to contain

| COMPOUND | % v/v |
|---|---|
| $CH_2=CHCl$ | 4.5 |
| c and t $CHCl=CHCl$ | 0.5 |
| $CH_2Cl\cdot CH_2Cl$ | 0.4 |
| CO | 0.1 |
| $CO_2$ | 1.3 |
| $H_2O$ | 7.2 |
| HCl | 28.9 |
| $O_2$ | 6.4 |
| $C_2H_4$ | 8.2 |
| $N_2$ | 42.5 |

What we claim is:

1. In a process for the manufacture of monohalogenated olefines wherein an olefine is reacted with hydrogen halide and a source of molecular oxygen at elevated temperature between 250°C and 550°C and in the presence of a supported catalyst where the support is selected from the group consisting of titania, zirconia and alumina and wherein the support has a specific surface area of between about 0.5 to 50m²/gram, the improvement comprising using as catalyst 0.01 to 2 percent by weight of the support of platinum or rhodium, 0.5 to 15 percent by weight of the support, expressed as the metal, of a chloride of a rare earth metal, and 0.5 to 15 percent by weight of the support, expressed as the metal, of a chloride of copper 2. A process as claimed in claim 1 in which a chloride of an alkali metal or an alkaline earth metal is incorporated in the catalyst in an amount not greater than 2 percent by weight of the support.

3. A process as claimed in claim 1 in which the proportion by weight of platinum or rhodium to the support is 0.02 to 1 percent.

4. A process as claimed in claim 1 in which the specific surface area of the support is less than 30 m²/gram.

5. A process as claimed in claim 1 in which the support is titania which has been calcined at a temperature in the range 600°C. to 1,100°C.

6. A process as claimed in claim 5 in which the support is titania which has been calcined at a temperature in the range 800°C. to 1,000°C.

7. A process as claimed in claim 1 in which a fixed bed of the supported catalyst is employed and in which the supported catalyst is diluted with further quantities of the same support or with a diluent.

8. A process as claimed in claim 1 in which a graded bed of the supported catalyst is employed.

9. A process as claimed in claim 1 in which a fluidised bed of catalyst is employed.

10. A process as claimed in claim 1 in which the olefine is ethylene.

11. A process as claimed in claim 1 in which the hydrogen halide is hydrogen chloride.

12. A process as claimed in claim 1 in which the hydrogen halide is hydrogen bromide.

13. A process as claimed in claim 1 in which a reaction temperature in the range 300°C. to 500°C. is employed.

14. A process as claimed in claim 1 in which the olefine is propylene.

15. A process as claimed in claim 1 in which the olefine is a straight or branched-chain olefine containing four or more carbon atoms.

16. A process as claimed in claim 1 in which the process is carried out in the presence of a gaseous diluent which is at least one of the following: nitrogen, carbon oxides, steam, excess olefine, excess hydrogen halide.

* * * * *

UNITED STATES PATENT OFFICE
CERTIFICATE OF CORRECTION

Patent No. 3,799,998     Dated March 26, 1974

Inventor(s) DAVID GEOFFREY MEAD

It is certified that error appears in the above-identified patent and that said Letters Patent are hereby corrected as shown below:

Please add the following to the front page format after the application number:

[30]  Foreign Application Priority Data

January 14, 1965    Great Britain    1743/65

Signed and Sealed this

Twenty-seventh Day of July 1976

[SEAL]

Attest:

RUTH C. MASON
*Attesting Officer*

C. MARSHALL DANN
*Commissioner of Patents and Trademarks*